US011533102B2

(12) United States Patent
Kubba et al.

(10) Patent No.: US 11,533,102 B2
(45) Date of Patent: Dec. 20, 2022

(54) OPTIMIZING DATA CAP LIMITED SERVICE PLANS

(71) Applicant: HUGHES NETWORK SYSTEMS, LLC, Germantown, MD (US)

(72) Inventors: Rajeev Kubba, Germantown, MD (US); Ying Wang, Germantown, MD (US); Shivaram Sitaram, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 358 days.

(21) Appl. No.: 16/735,185

(22) Filed: Jan. 6, 2020

(65) Prior Publication Data

US 2021/0211190 A1 Jul. 8, 2021

(51) Int. Cl.
*H04B 7/185* (2006.01)
*G06N 20/00* (2019.01)
*H04L 5/00* (2006.01)

(52) U.S. Cl.
CPC ......... *H04B 7/18526* (2013.01); *G06N 20/00* (2019.01); *H04B 7/18586* (2013.01); *H04B 7/18589* (2013.01); *H04L 5/0082* (2013.01)

(58) Field of Classification Search
CPC ........ H04B 3/00; H04B 3/04; H04B 7/18526; G06F 13/14; H04L 12/40058; H04L 29/06027; H04L 41/147; H04L 41/5061; H04L 41/0896; H04L 41/5009; H04L 43/0882; H04L 47/24; H04L 47/783; H04L 47/823; H04N 21/2402; H04S 1/007; H04W 16/14; H04W 28/20
See application file for complete search history.

(56) References Cited

U.S. PATENT DOCUMENTS

| | | | |
|---|---|---|---|
| 7,391,780 B1* | 6/2008 | Stone | H04L 41/0896 370/252 |
| 9,336,483 B1* | 5/2016 | Abeysooriya | G06N 3/08 |
| 9,858,559 B2* | 1/2018 | Raleigh | G06Q 40/12 |
| 2006/0223495 A1* | 10/2006 | Cassett | H04M 3/42068 455/405 |
| 2013/0196617 A1* | 8/2013 | Zalmanovitch | H04W 4/24 455/405 |
| 2017/0019307 A1* | 1/2017 | Brooks | H04N 21/4181 |
| 2019/0354814 A1* | 11/2019 | Schobel | G06K 9/6278 |

\* cited by examiner

*Primary Examiner* — Walter J Divito
(74) *Attorney, Agent, or Firm* — Potomac Technology Law, LLC

(57) ABSTRACT

An apparatus and method for optimizing selection of data cap limited service plans. A model is created in order to predict bandwidth usage by existing subscribers in a satellite communication system. The model is trained with usage data for all subscribers of the satellite communication system over a predetermined time interval, and used to analyze usage patterns of each subscriber. Bandwidth usage is predicted for each subscriber relative to an existing service plan based, at least one recommendation is generated for optimizing use of bandwidth in the satellite communication system based on the analysis and predicted bandwidth usage.

20 Claims, 9 Drawing Sheets

Sankey Table

[Copy] [CSV] [Excel] [Print]　　　　　　　　　　　　Search: [____]

| Current Plan ▸ | Recommended Plan ▸ | Device Count ▸ |
|---|---|---|
| 10G | 20G | 8742 |
| 10G | 30G | 131 |
| 10G | 50G | 30 |
| 20G | 10G | 13161 |
| 20G | 30G | 847 |
| 20G | 50G | 536 |
| 30G | 10G | 319 |
| 30G | 20G | 16853 |
| 30G | 50G | 924 |
| 50G | 10G | 34 |
| 50G | 20G | 2430 |
| 50G | 30G | 981 |

Fig. 6

OPTIMIZING DATA CAP LIMITED SERVICE PLANS

BACKGROUND INFORMATION

High throughput satellite (HTS) systems are used to provide voice and data access in areas that may lack cellular or landline infrastructure. HTS systems typically employ multiple gateways (or satellite hubs) to provide service to customers by utilizing very small aperture terminals (VSATs, or simply "terminals"). Terminals and gateways are often located within a defined coverage beam of the satellite, thereby enabling communication via a bent pipe path. While current HTS systems are capable of providing stable and fast internet services over satellite link, it is challenging and essential to efficiently manage the capacity allocation by selling services with data caps suitable to each customer, ensuring high service quality for all satellite network customers.

HTS systems operate at a fixed throughput (or bandwidth) which is shared among all customers. Unlike terrestrial based internet service providers (ISPs), additional bandwidth cannot be added easily due to the cost constraints and complexities associated with building and launching additional satellites into orbit. As the number of subscribers increases, the total subscriber throughput can possibly reach or exceed the fixed maximum bandwidth of the system. It is therefore important to find effective methods to better allocate resources to more customers. From the business standpoint, it would be important to motivate the heavy users, who are also low data plan subscribers, to upgrade to higher data plans. Meanwhile, resources being used by some super heavy users may be allocated to other potential new customers under the current maximum satellite bandwidth.

Based on the foregoing, there is a need for an approach to better allocate existing satellite resources to more customers.

BRIEF SUMMARY

An apparatus and method are disclosed for optimizing selection of data cap limited service plans. According to an embodiment, the apparatus includes one or more processors configured to: create a model for predicting bandwidth usage by existing subscribers in a satellite communication system; train the model with usage data for all subscribers of the satellite communication system over a first predetermined time interval; analyze usage patterns of each subscriber over a second predetermined time interval using the trained model; predict bandwidth usage for each subscriber relative to an existing service plan based, at least in part, on the analysis; and generate at least one recommendation for optimizing use of bandwidth in the satellite communication system based on the analysis and predicted bandwidth usage.

According to another embodiment, the method includes: creating a model for predicting bandwidth usage by existing subscribers in a satellite communication system; training the model with usage data for all subscribers of the satellite communication system over a first predetermined time interval; analyzing usage patterns of each subscriber over a second predetermined time interval using the trained model; predicting bandwidth usage for each subscriber relative to an existing service plan based, at least in part, on the analysis; and generating at least one recommendation for optimizing use of bandwidth in the satellite communication system based on the analysis and predicted bandwidth usage.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 6 is a diagram illustrating subscriber service plan recommendations, according to another embodiment;

DETAILED DESCRIPTION

An apparatus and method for optimizing selection of data cap limited service plans are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
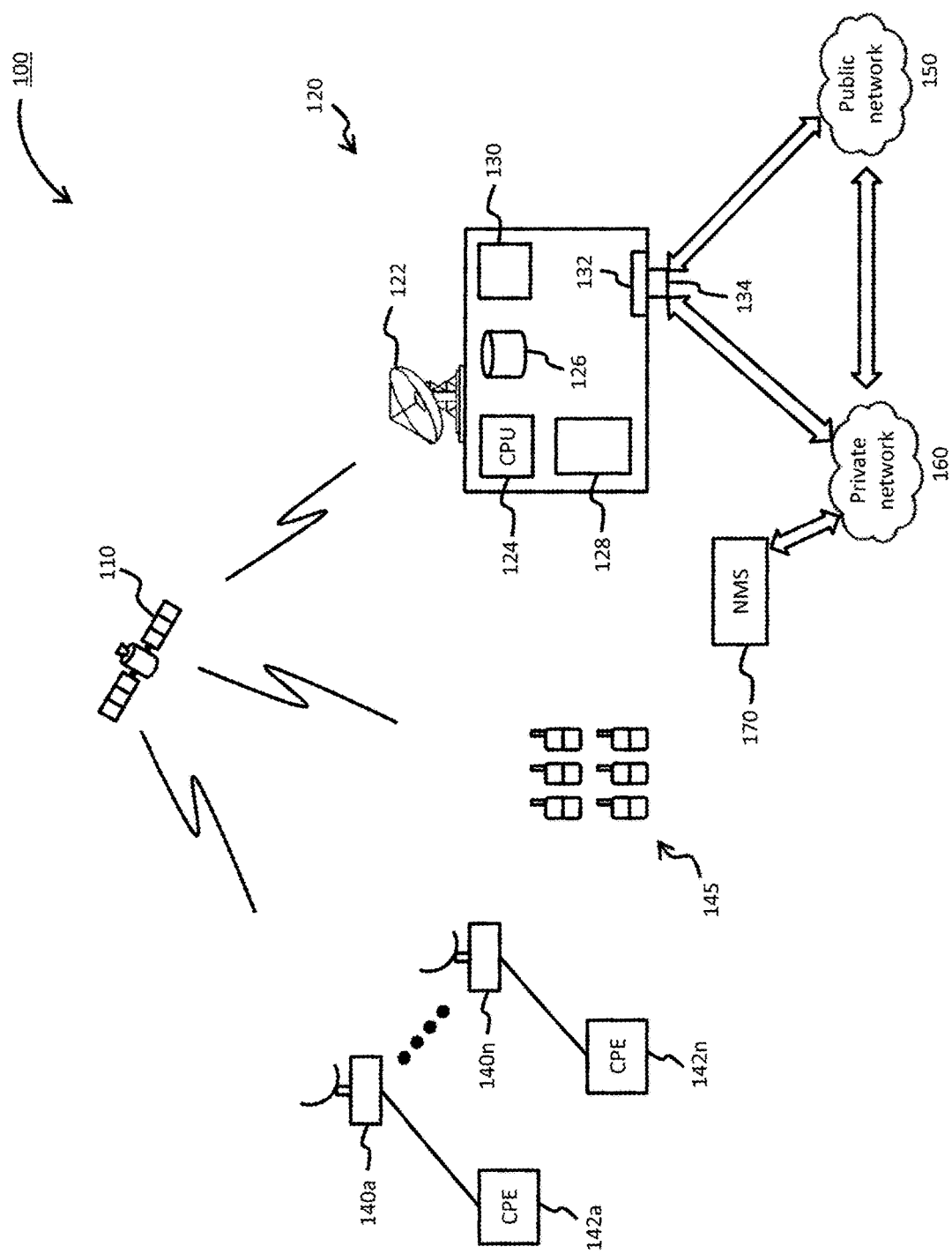
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
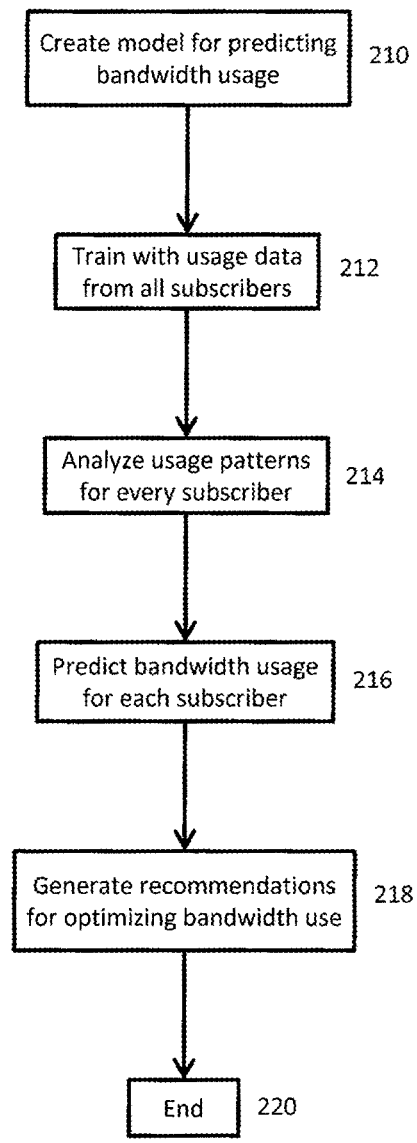
FIG. 2 is a flowchart of a process for optimizing data plans in the system of FIG. 1, according to one embodiment.

FIG. 2 is a flowchart of a process for optimizing data plans, in accordance with one or more embodiment. At 210, a model is created for predicting bandwidth usage within the satellite communication system. As previously discussed, the bandwidth usage corresponds to the amount of data uploaded and downloaded by subscribers. The model can correspond to, for example, a data cap limited service plan optimizer (DCL-SPO). At 212, the model is trained with usage data from all subscribers of the satellite communication system. According to at least one embodiment, the usage data used to train the model can be collected over a first predetermined time interval. Depending on the specific implementation, the time interval can range between 3 to 6 months. It should be noted, however, that certain implementations may require more or less usage data for training the model. At 214, usage patterns are analyzed for every subscriber. Thus, after training the model with usage data from all subscribers, the usage patterns of individual subscribers are analyzed by the trained model.

At 216, bandwidth usage for each subscriber is predicted. More particularly, the model can be configured to analyze bandwidth usage for each subscriber over a second predetermined time interval such as one month, for example, in order to predict the amount of usage the subscriber is likely to use the following month. According to at least one embodiment, the second predetermined time interval used to predict the bandwidth usage for subscribers can be based on the customer's service plan billing cycle. For example, if the service plan is billed on a monthly basis, then the second predetermined time interval can be selected as one month. If the service plan is billed bi-monthly, then the second predetermined service time interval can be selected as two months. At 218, recommendations are generated for optimizing bandwidth use within the satellite communication system. According to various embodiments, the recommendations can be based, for example, on the analysis of individual subscriber usage patterns as well as the predicted bandwidth usage for each subscriber. Depending on the specific implementation, the recommendations can optimize the use of resources within the satellite communication system and/or optimize the service plan of individual subscribers. The process ends at 220.

Figure 3:
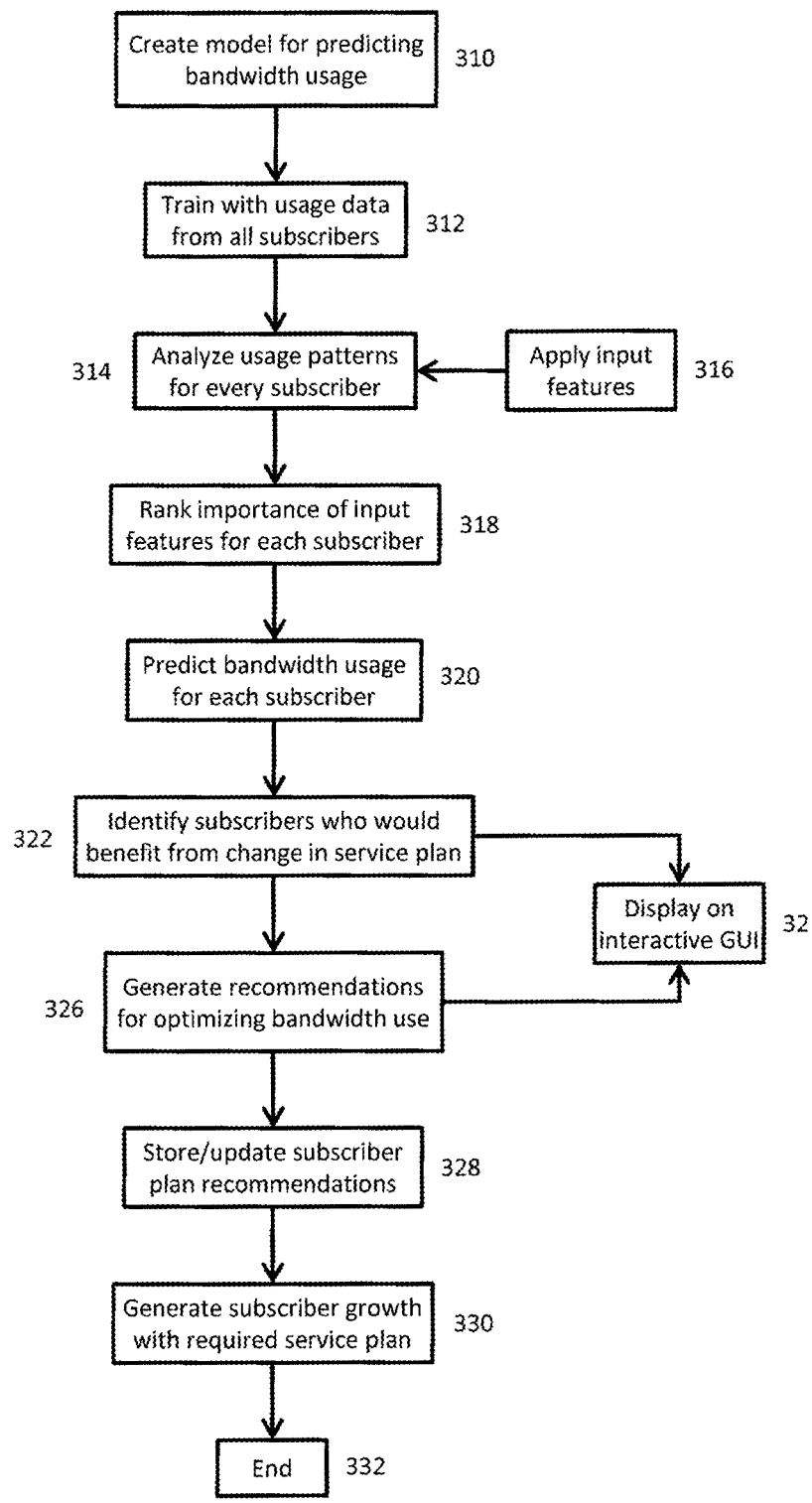
FIG. 3 is a flowchart of a process for optimizing data plans, according to various embodiments.

FIG. 3 is a flowchart of a process for optimizing data plans, in accordance with various embodiments. At 310, a model such as a DCL-SPO is created for predicting bandwidth usage within a satellite communication system. According to one or more embodiments, the model can be created by utilizing multiple supervised machine-learning algorithms, and at least one voting classification algorithm. Such machine learning algorithms can include, for example, Random Forest, K Nearest Neighbors, Support Vector Machine, Artificial Neural Network and Ensemble Voting Classifier. The algorithms are fine tuned to produce correct plan fit predictions for the subscribers using the input feature set prepared based on domain knowledge gained by operating the IP over Satellite services. Random Forests (RF) are machine learning models for classification and regression by constructing a forest of decision trees. Each tree takes different features and different bunches of row indexes. Primary parameters used to tune the random forest model for maximum accuracy include the number of trees and the depth of the individual tree. K nearest neighbors (KNN) is a non-parametric method used for classification and regression. The prediction result is classified by a vote of its neighbors. The primary parameter to tune is the k number. Support vector machine (SVM) is a discriminative classifier defined by a separating hyperplane. Based on a kernel function, a non-linear classification can be achieved. The primary parameters to tune include gamma($\delta$) and C, which balance the underfitting and overfitting of the models. Artificial neural networks are based on a collection of connected units or nodes called neurons. The parameters tuned include number of hidden layers and corresponding number of neurons in each layer. Voting classifier is an ensemble learning based on the three models including random forest, K nearest neighbors, and support vector machine.

At 312, the model is trained with usage data from all current subscribers. The usage data can include, for example, information such as download bytes, upload bytes, usage in different types of services (e.g., bulk transfer, streaming, etc.), usage pattern by days of the month, hour of the day, usage with in the service plan's data allowances, overage data, frequency of exceeding the plan's data allowances, subscribers' billing (plan change history, current plan, purchased tokens), etc. Furthermore, the usage data can be processed (as discussed with respect to FIG. 4 below) so that it is better tailored for training the model.

At 314, usage patterns of every subscriber are analyzed. According to various embodiments, input features specific to the satellite communication system can be incorporated into the analysis in order to improve the accuracy of the results. This is illustrated at 316. According to one system implementation, the input features can include anytime download and upload bytes, anytime bucket remaining, token purchases, days of data, first day exceeding peak hour capacity, plan change status, download bytes after exceeding peak hour capacity, and upload bytes after exceeding peak hour capacity. At 318, the importance of the input features is ranked for each subscriber. More particularly, the input features can correspond to various usage types, habits, or preferences for each subscriber. Different subscribers may utilize the satellite communication system differently. For example, certain subscribers may utilize more bandwidth for downloading data instead of uploading data, whereas other subscribers may upload more data than they download. Thus, such input features would differ for the subscribers, depending on the manner in which they use the system.

At 320, bandwidth usage is predicted for each current subscriber. According to the illustrated embodiment, the model can incorporate the ranking of each customer's input features in order to improve the prediction for the bandwidth usage. At 322, subscribers who may benefit from a change in their current service plans are identified. For example, certain subscribers may utilize a plan which exceeds the amount of data they are actually using, while other subscribers may utilize a plan which does not include sufficient data. For example, if a subscriber currently utilizes a 50 GB plan but utilizes less than 10 GB per month, over 40 GB of bandwidth is wasted per month by guaranteeing this available bandwidth to the subscriber. Since the overall bandwidth available within the satellite communication system is fixed, this bandwidth is not available for upgrading current subscribers or adding new subscribers. Furthermore, the cost of the 50 GB plan may be significantly higher than that of a lower data plan (e.g., 10 or 20 GB). Conversely, users who exceed their allocated data must purchase additional data (in the form of tokens) at a much higher rate in order to utilize the network until the next month.

According to at least one embodiment, a graphical user interface (GUI) can be generated and the number of identified subscribers can be displayed on the interface. The actual upgrade plan can also be displayed. For example, the GUI may be configured to display information regarding customers currently subscribed to the 10 GB plan, and indicate how many should upgrade to the 20 GB plan, the 30 GB plan, the 50 GB plan, etc. Similar information can be provided if customers currently subscribing to one of the other plans (e.g., 20 GB, GB, 50 GB, etc.) are being examined. If customers currently subscribed to the 30 GB plan are being examined, for example, the GUI can be configured to display, in part, information pertaining to customers who should upgrade to a higher plan or downgrade to a lower plan. Thus, an operator can visually assess the number of subscribers who would benefit from such a change in their service plans. Furthermore, the display may interactively provide other information, such as the location of heavy users, subscribers who may benefit from a change in service plan based on traffic density in coverage beams of the satellite communication system, etc.

At 326, various recommendations are generated for optimizing bandwidth use. Depending on the specific implementation, the recommendations can also be displayed on the interactive GUI at 324. According to at least one embodiment, the recommendations can be based, at least in part, on an analysis of the location of different subscribers. For example, if a particular coverage beam has a high density of subscribers who utilize large amounts of data, frequency resources within multiple adjacent coverage beams can be reallocated in order to improve the available bandwidth within the coverage beam containing the high density of heavy users. Additionally, the recommendations can include changes in service plans to better accommodate the actual amount of data used by subscribers.

At 328, any service plan recommendations for subscribers can be stored within a system database for subsequent review and analysis. Furthermore, according to one or more embodiments, the model can continuously analyze usage patterns for existing subscribers and provide new recommendations for existing service plans. Thus, it may be the case that the usage patterns of a particular subscriber changes over time such that a previous plan recommendation may no longer be applicable for the amount of data being used by the subscriber. According to various embodiments, the subscriber plan recommendations can be used by customer service representatives to quickly address service calls. For example, a subscriber who consistently runs out of data may have questions about their overall data usage and available options. Such questions may be quickly answered by the customer service representative using information stored in the system database.

At 330, a plan for achieving subscriber growth is generated. The plan can be based, for example, on the analysis of subscriber usage patterns as well as the subscriber plan recommendations. As previously discussed, for example, a subscriber who currently pays for a 50 GB plan but utilizes only 10 GB of data per month may receive a recommendation to change to a 10 GB plan. This would result in the availability of additional bandwidth that can be used by new subscribers. For example, the reacquired 40 GB of bandwidth could become available for two new subscribers requiring 20 GB plans, four subscribers requiring 10 GB plans each, one subscriber requiring a 20 GB plan and two subscribers requiring 10 GB plans, etc. The process ends at 332.

Figure 4:
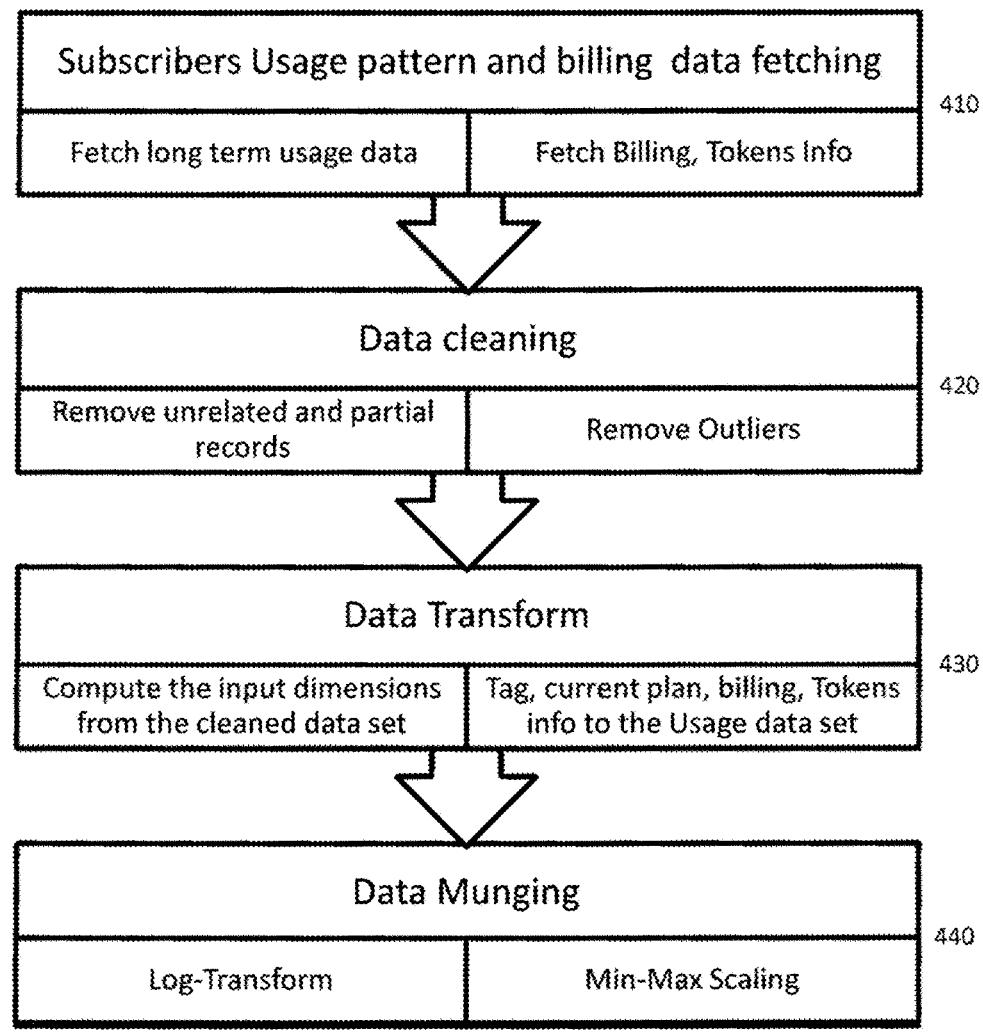
FIG. 4 is a flowchart of a process for collecting and preparing subscriber usage data for training a data cap limited service plan optimizer, according to one embodiment.

FIG. 4 is a flowchart of a process for collecting and preparing subscriber usage data for training a DCL-SPO model, in accordance with one or more embodiments. At 410, all subscriber usage information is obtained. This can include download bytes, upload bytes, usage in different types of services (such as bulk data transfer, streaming, etc.), usage pattern by days of the month, hour of the day, usage with in the service plan's data allowances, overage data, frequency of exceeding the plan's data allowances, and subscribers billing (plan change history, current plan, purchased tokens). At 420, a data cleaning process is implemented. Usage records of subscribers who are not be included in the plan fit recommendations are removed. Partially filled records are extrapolated within reasonable limits or removed altogether. Finally, outlier records which are known to decrease the model accuracy are removed. At 430, the data is transformed for predicting bandwidth usage for subscribers by applying various system input features. More particularly, 8 input dimensions (or features) are computed from the cleaned data set, using calculations derived based on data analytics from the satellite communication system. Tags are subsequently applied to computed dimensions with corresponding service-plan, token purchase history, billing information etc.

At 440, a data munging process is implemented. This can include, for example, Log-Transform of anytime download, upload bytes, tokens applied, download bytes in anytime throttled state, and upload bytes in anytime throttled state input dimensions (or input features). Additionally, min-max scaling of the all input feature sets are done to normalize the whole data set. According to at least one embodiment, the input dimensions may be defined as follows:

Anytime Download and Upload Bytes: The monthly download and upload bytes during the peak hours.

Anytime Bucket Remaining: The remaining capacity in the peak hour bucket.

Token Applied: The capacity applied by using tokens.

Days of Data: The total active days for the customer for one month.

First FAPed Day: The day of the billing cycle when the customers use up all the peak hour capacity and Fair Access Policy (FAP) is applied.

Plan Change Status: Whether the customer changed plan during the month.

Download Bytes Anytime FAP: The download bytes during peak hours after the customer got throttled by using up the peak hour bucket.

Upload Bytes Anytime FAP: The upload bytes during peak hours after the customer got throttled by using up the peak hour bucket.

Figure 5:
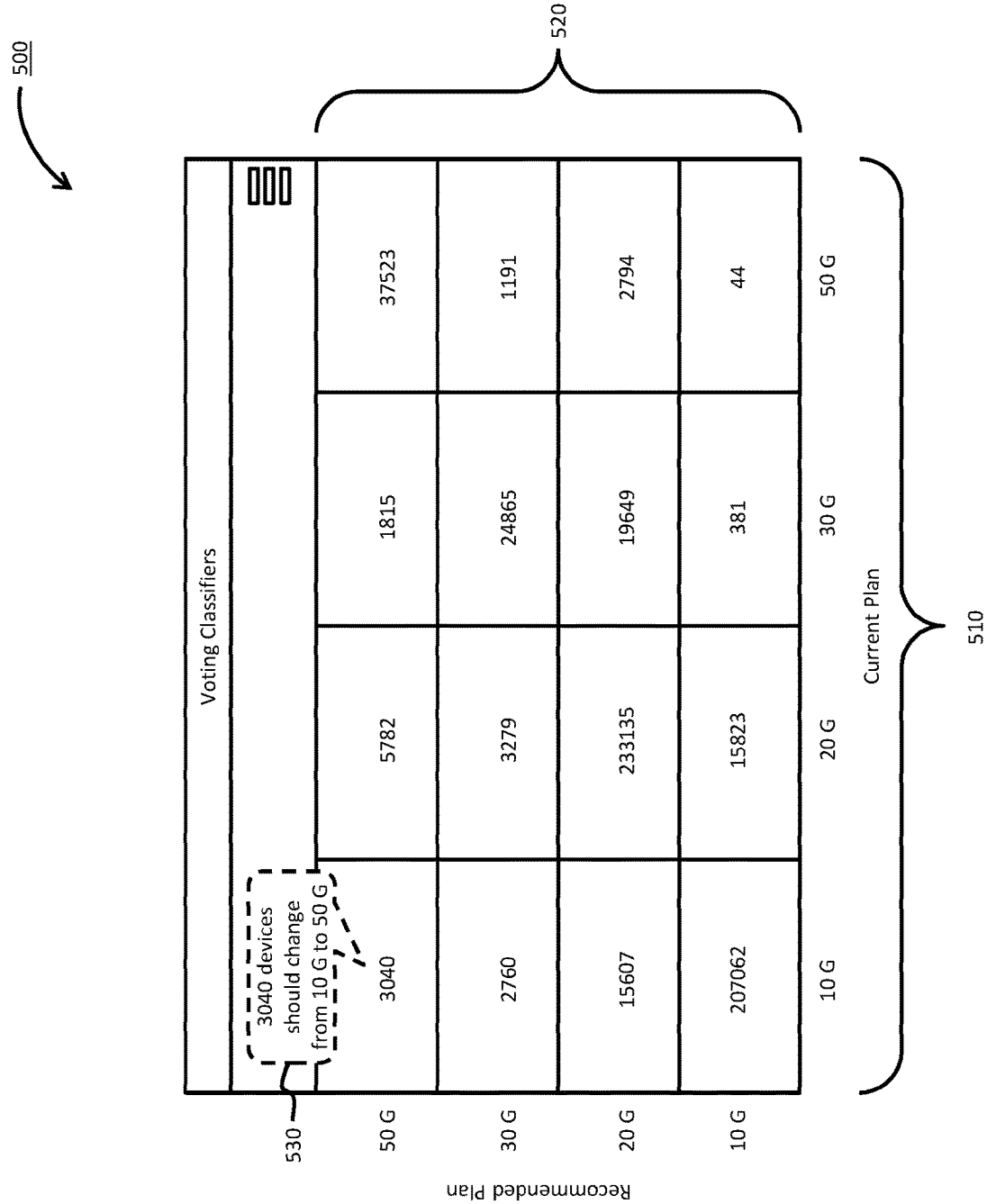
FIG. 5 is a diagram illustrating subscriber service plan recommendations, according to one embodiment.

FIG. 5 is a diagram 500 illustrating subscriber service plan recommendations, in accordance with at least one embodiment. As previously discussed, various embodiments provide for an interactive graphical user interface (GUI) for displaying information regarding subscriber service plan recommendations. The diagram 500 is configured as a table having a plurality of columns 510 and rows 520. The columns 510 represent available subscription plans while the rows 520 represent recommended plans. For example, the bottom left entry indicates that 207,062 subscribers are enrolled in the 10 Gb plan (first column). Moving up the column to the next row indicates that the model recommends 15,607 subscribers would be better served on the 20 Gb plan. Continuing up to the next row, the model recommends switching 2,760 subscribers should upgrade to the 30 Gb plan, and switching 3,040 subscribers to the 50 Gb plan. As further illustrated in FIG. 5, selecting or hovering a pointer device interactively generates a popup 530 describing the entry. Moving to the second column (20 Gb), the bottom row illustrates the model's recommendation that 15,823 subscribers should be downgraded from the 20 Gb plan to the 10 Gb plan. Moving up one row illustrates the current number of subscribers enrolled in the 20 Gb plan.

FIG. 6 is a diagram 600 illustrating subscriber service plan recommendations, according to another embodiment. The diagram 600 can be presented a table format to quickly illustrate recommended changes in service plan. Each row of the table specifies a current plan, a recommended plan, and the number of devices (or subscribers) who are being recommended for the change.

Figure 7:
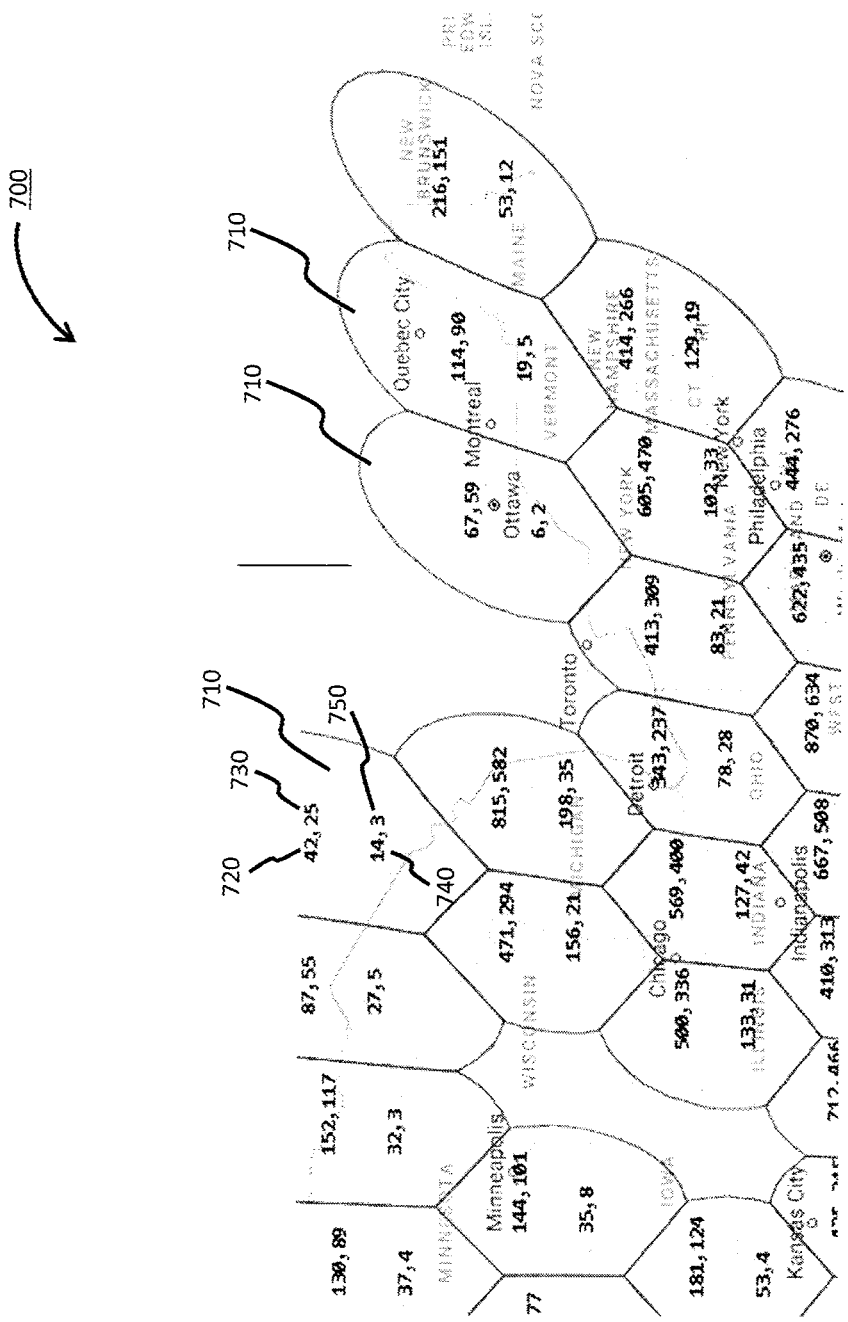
FIG. 7 is a diagram illustrating subscriber service plan recommendations within different coverage beams, according to one embodiment.

FIG. 7 is a map 700 illustrating subscriber service plan recommendations within different coverage beams, in accordance with one or more embodiments. The map 700 illustrates a plurality of coverage beams 710 for the Northeast portion of the U.S. Each coverage beam contains information pertaining to recommended changes in service plan. According to the illustrated embodiment, the information pertains to subscribers currently enrolled in the 10 Gb plan. Reference numeral 720 indicates that a total of 42 subscribers are recommended for changes in service plan. Reference numeral 730 indicates that 25 subscribers are recommended for changing from the 10 Gb service plan to the 20 Gb service plan. Reference numeral 740 indicates that 14 subscribers are recommended for changing from the 10 Gb service plan to the 30 Gb service plan. Reference numeral 750 indicates that 25 subscribers are recommended for changing from the 10 Gb service plan to the 50 Gb service plan. Accordingly, an operator can select a different service plan, such as the 20 Gb plan, and view the recommendations for changing to the other three service plans, namely the 10 Gb, 30 Gb, and 50 Gb.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described model and systems. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C #, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 8:
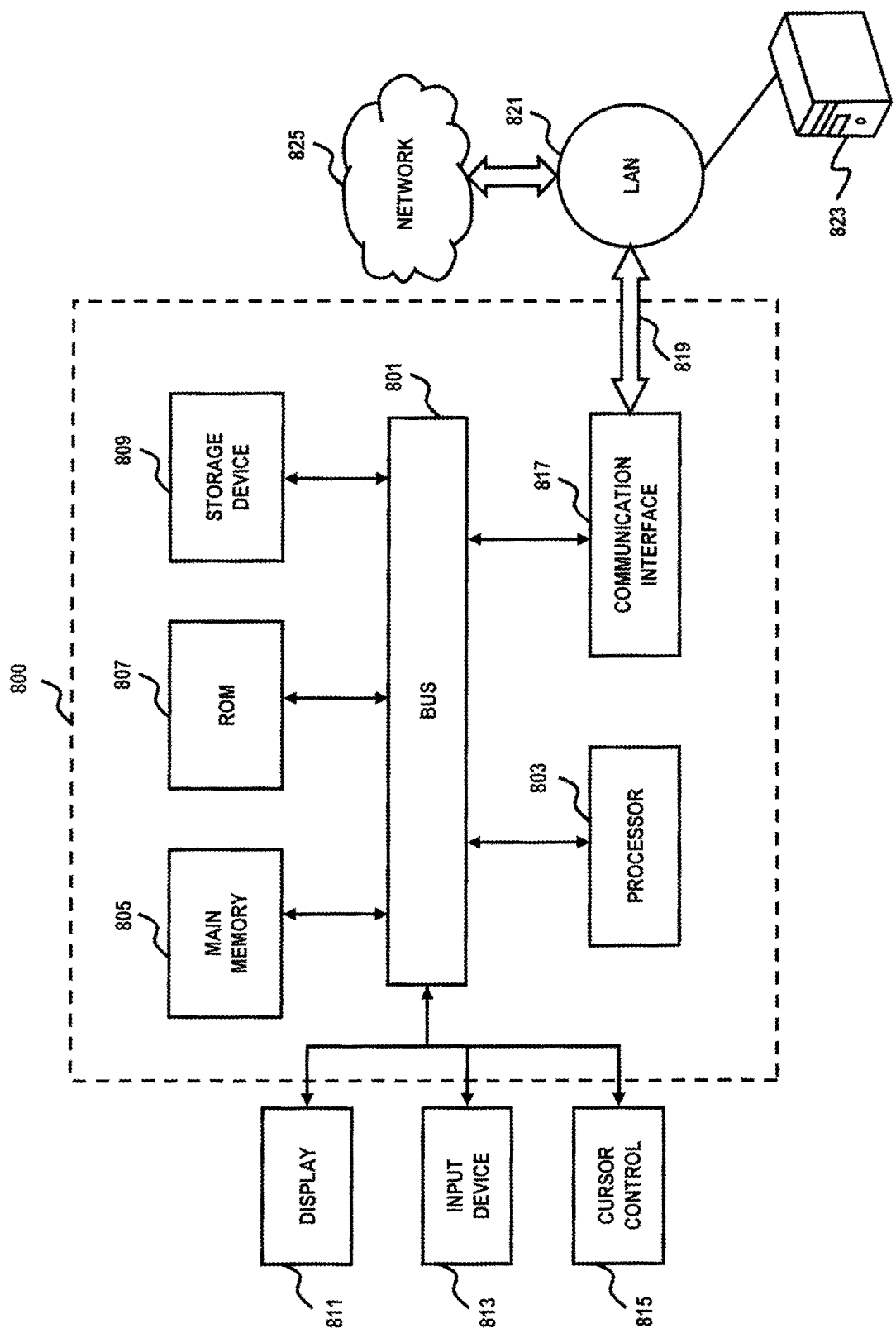
FIG. 8 is a diagram of a computer system that can be used to implement various exemplary features and embodiments.

FIG. 8 is a diagram of a computer system that can be used to implement features of various embodiments. The computer system 800 includes a bus 801 or other communication mechanism for communicating information and a processor 803 coupled to the bus 801 for processing information. The computer system 800 also includes main memory 805, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a light emitting diode (LED) or other flat panel displays, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811. Additionally, the display 811 can be touch enabled (i.e., capacitive or resistive) in order facilitate user input via touch or gestures.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a High Definition Multimedia Interface (HDMI), etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 such as a wide area network (WAN) or the Internet. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Non-volatile media can further include flash drives, USB drives, microSD cards, etc. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 9:
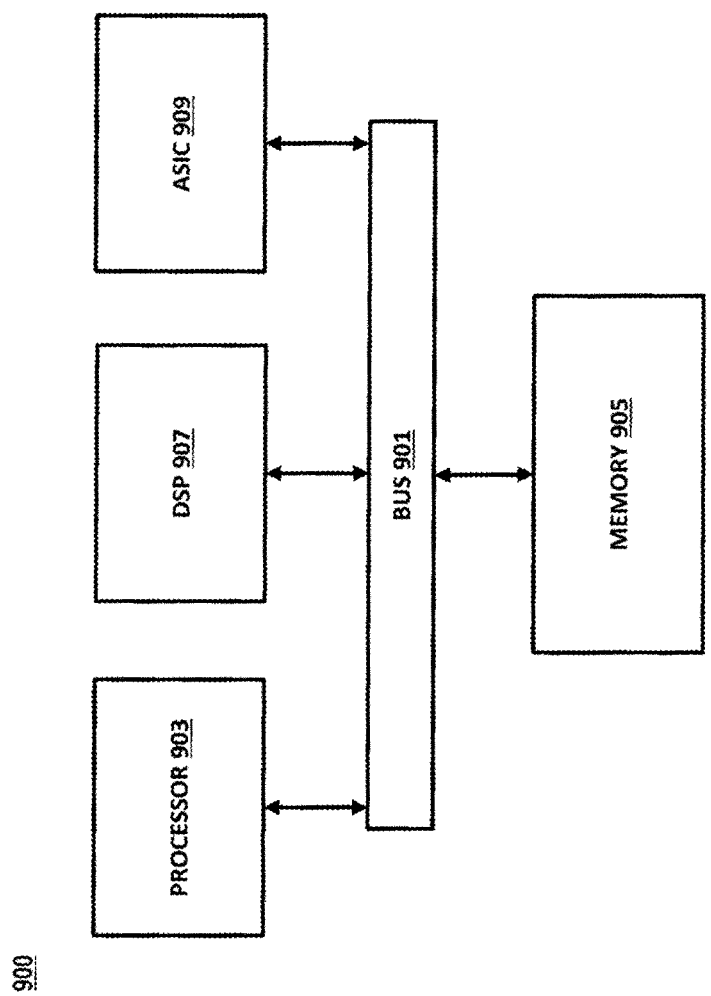
FIG. 9 is a diagram of a chip set that can be used to implement various exemplary features and embodiments.

FIG. 9 illustrates a chip set 900 upon which features of various embodiments may be implemented. Chip set 900 is programmed to implement various features as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of the figures.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 905 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
creating a model for predicting bandwidth usage by existing subscribers in a satellite communication system;
training the model with usage data for all subscribers of the satellite communication system over a first predetermined time interval;
analyzing usage patterns of each subscriber over a second predetermined time interval using the trained model;
predicting bandwidth usage for each subscriber relative to an existing service plan based, at least in part, on the analysis; and
generating at least one recommendation for optimizing use of bandwidth in the satellite communication system based on the analysis and predicted bandwidth usage.

2. The method of claim 1, wherein creating the model further comprises applying multiple supervised machine-learning algorithms and one or more voting classification algorithm.

3. The method of claim 2, wherein:
the multiple supervised machine-learning algorithms include at least random forest, K nearest neighbors, support vector machine, and artificial neural network; and
the one or more voting classification algorithms include at least an ensemble voting classifier.

4. The method of claim 1, wherein the usage patterns are analyzed based, at least in part, on one or more of the following input features for the model: anytime download and upload bytes, anytime bucket remaining, token purchases, days of data, first day exceeding peak hour capacity, plan change status, download bytes after exceeding peak hour capacity, and upload bytes after exceeding peak hour capacity.

5. The method of claim 4, further comprising ranking an importance of each input feature for each subscriber based on data usage history for each subscriber.

6. The method of claim 5, wherein predicting bandwidth usage further comprises customizing the prediction by applying the ranked input features for each subscriber during the prediction.

7. The method of claim 1, wherein generating at least one recommendation further comprises reallocating frequency resources within multiple adjacent coverage beams in the satellite communication system to improve available bandwidth within at least one of the multiple adjacent coverage beams.

8. The method of claim 1, wherein generating at least one recommendation further comprises improving allocation of satellite resources to accommodate new subscribers.

9. The method of claim 8, further comprising:
identifying subscribers who would benefit from a change in existing service plan; and
produce plan recommendations for the identified subscribers based, at least in part, on the analysis of usage patterns for the identified subscribers.

10. The method of claim 9, further comprising:
recommending a higher service plan for subscribers having high data requirements; and
recommending a lower service plan for subscribers having low data requirements.

11. The method of claim 9, further comprising:
storing service plan recommendations for subscribers in a system database; and
dynamically updating the service plan recommendations based on changes in data usage by the subscribers.

12. The method of claim 1, further comprising generating at least one growth plan for subscribers of the satellite communication system based on the at least one recommendation.

13. The method of claim 12, wherein the at least one subscriber growth plan includes a required service plan for each subscriber in order to achieve the at least one growth plan.

14. The method of claim 12, wherein the at least one subscriber growth plan optimizes use of total bandwidth in the system to maximize the number of new subscribers.

15. The method of claim 1, further comprising generating a graphical user interface (GUI) for providing a visual representation of subscribers who would benefit from a change in existing service plans and/or the location of the represented subscribers.

16. The method of claim 15, wherein the visual representation includes a geographical map for providing location information for the represented subscribers, wherein the geographical map corresponds to a coverage area for the satellite communication system.

17. The method of claim 16, further comprising displaying bandwidth usage distribution within the coverage area for the satellite communication system.

18. The method of claim 16, further comprising:
displaying coverage beams for the satellite communication system; and
displaying a number of subscribers who would benefit from a change in existing service plans within each coverage beam.

19. An apparatus comprising:
one or more processors configured to:
create a model for predicting bandwidth usage by existing subscribers in a satellite communication system;
train the model with usage data for all subscribers of the satellite communication system over a first predetermined time interval;
analyze usage patterns of each subscriber over a second predetermined time interval using the trained model;
predict bandwidth usage for each subscriber relative to an existing service plan based, at least in part, on the analysis; and
generate at least one recommendation for optimizing use of bandwidth in the satellite communication system based on the analysis and predicted bandwidth usage.

20. The apparatus of claim 19, wherein the one or more processors are further configured to generate the at least one recommendation by reallocating frequency resources within multiple adjacent coverage beams in the satellite communication system to improve available bandwidth within at least one of the multiple adjacent coverage beams.

* * * * *